Jan. 30, 1962 R. H. BUSHNELL ETAL 3,019,434
AIRCRAFT COLLISION WARNING SYSTEM
Filed Oct. 14, 1957
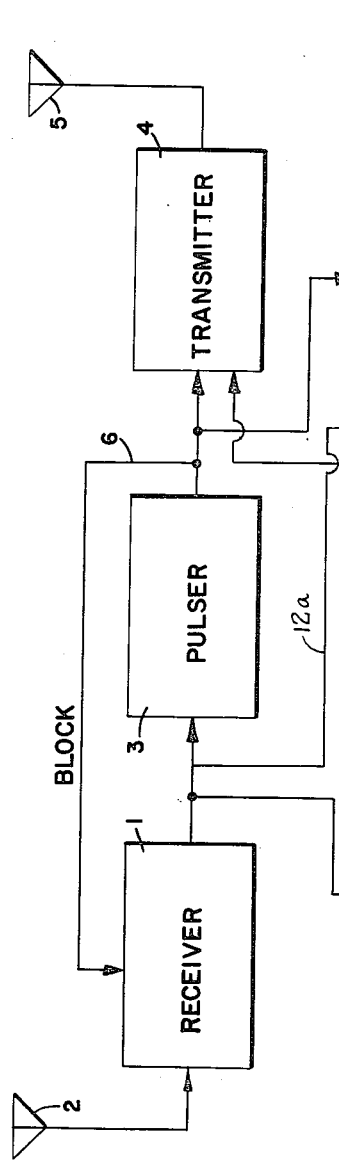
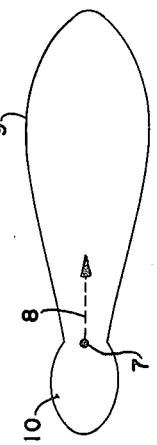
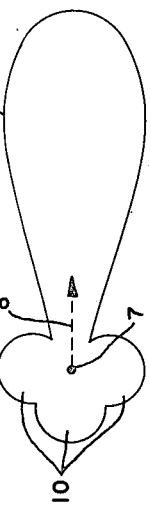
INVENTORS.
ROBERT H. BUSHNELL
BY VINCENT J. CHIMERA
ATTORNEY

United States Patent Office 3,019,434
Patented Jan. 30, 1962

3,019,434
AIRCRAFT COLLISION WARNING SYSTEM
Robert H. Bushnell, Moorestown, N.J., and Vincent J. Chimera, Akron, Ohio, assignors to Goodyear Aircraft Corporation, Akron, Ohio, a corporation of Delaware
Filed Oct. 14, 1957, Ser. No. 689,832
10 Claims. (Cl. 343—101)

This invention relates to systems for preventing vehicle collision, and, more particularly, is concerned with an aircraft collision warning system of the cooperative type, i.e., a system requiring apparatus in both of the aircraft wishing to avoid collision.

The very large increase in the number of aircraft in recent years has resulted in certain very unfortunate aircraft collisions, with an attendant loss of life and aircraft. Various systems to prevent collision have been proposed, both of the cooperative type of the present invention, and of the uncooperative type, i.e., a system in which the aircraft to be warned is the only one which needs carry warning apparatus. However, these proposed systems have been relatively complex and expensive, requiring comparatively heavy gear and continuous servicing, or have not been sufficiently sensitive, reliable, or fast acting.

It is the general object of the present invention to avoid and overcome the foregoing and other difficulties of and objections to known systems by the provision of a relatively light weight and inexpensive system, capable of easy installation and requiring only a minimum of servicing, and which possesses a comparatively high sensitivity and rapidity of action.

Another object of the invention is the provision of a cooperative system for warning against vehicle and particularly aircraft collision, and which is characterized by automatic action without pilot attention, maneuvering, or adjustment, until such time as collision warning signals are given to the pilot who can immediately through the warning apparatus itself communicate with the pilot of the other aircraft to give altitude and heading information whereby collision can be avoided.

The foregoing objects of the invention, and other objects which will become apparent as the description proceeds, are achieved by the provision for each aircraft of an apparatus including a free-running but triggerable pulser for generating a periodic short pulse having a relatively low pulse repetition frequency, a radio transmitter fired by each pulse, an antenna for propagating the resulting radio frequency pulse over relatively short range but in a direction usually at least several times greater forwardly of the aircraft than laterally or vertically, a receiver tuned to the frequency of the transmitter and adapted to trigger the pulser to generate a pulse upon the reception of a pulse, means to block the receiver upon the transmission of a pulse, and means indicating a sharp increase in the pulse repetition frequency of the transmitter. Preferably included with the apparatus are push-to-talk microphone and speech circuits for modulating the transmitter.

The means for indicating a sharp increase in the pulse repetition frequency may include a divider for fractionally reducing the pulse repetition frequency at the output of the divider, and means for audibly reproducing the output of the divider, said audible means producing an increase in pitch with an increase in pulse repetition frequency, and a decrease in pitch with a decrease in pulse repetition frequency.

For a better understanding of the invention reference should be had to the accompanying drawings wherein FIGURE 1 is a block diagram of the apparatus of the invention;

FIGURE 2 is a plan view of a typical wave pattern generated by the antenna of the apparatus; and FIGURE 3 is a side elevation of a typical wave pattern generated by the antenna of the apparatus.

Having more particular reference to the drawings, the numeral 1 indicates generally a conventional receiver, connected to the transmitter, hereinafter described, or to a separate receiving antenna. The receiver 1 is connected, as diagrammatically shown, to a pulser 3 which is a conventional blocking oscillator or multi-vibrator which is normally and initially free running to produce, for example, a ten microsecond pulse at a pulse repetition frequency of 100 cycles per second. However, the pulser is adapted to be triggered by a pulse picked up by the receiver 1 and passed to the pulser 3, all as hereinafter described.

The pulser 3 connects to and controls a transmitter 4, as diagrammatically shown, with the transmitter 4 actually constituting a radio frequency generator transmitting by way of antenna 5 radio frequency pulses, for example, at 132 megacycles per second and having a band width of 100 kilocycles per second. As aforesaid, the antenna 5 may be the antenna 2, i.e., the antennas 2 and 5 can be combined into a single antenna, and in any event a blocking feedback connection 6 extends from the pulser 3 to the receiver 1 to block the receiver 1 during the time of transmission of each pulse, all in accord with conventional radar technique. The receiver 1 is tuned to the frequency of the pulse transmitted by the transmitter 4.

The receiver 1, pulser 3, transmitter 4, and speech circuits hereafter described together constitute apparatus for both sending and receiving and can be collectively called a transponder.

FIGURES 2 and 3 show typical proposed effective propagation patterns for the antenna 5. For example, with the aeroplane 7 flying in the direction shown by the dotted arrow 8 the propagation pattern may include a strong lobe 9 in the direction of flight such that the warning system is effective for twenty miles in this direction. Lobes 10 extend such that the warning system is effective, for example, five miles to the rear and either side of the aircraft, all as shown in the plan view of FIGURE 2 of the propagation pattern. FIGURE 3 shows the side elevation of the propagation pattern with the airplane 7 flying in the direction of the dotted arrow 8, and with lobe 9 extending such that the warning system is effective, for example, twenty miles in the direction of flight, some five miles to the rear of the airplane being covered by lobe 10, and with the effective region extending something less than a mile in a vertical direction above and below the aircraft.

Of course, the effective region of wave propagation is a function of the specific antenna type, the frequency utilized, and the power of the transmitter. It has been determined that relatively low power, for example 4 watts input, can be utilized in the apparatus to effect the range described, and this is good in order to confine the operation of the apparatus to airplanes within collision distance of each other. More specifically, employing the apparatus of the invention in conjunction with a 400 knot aeroplane, and with warning being established twenty miles ahead, five miles to the sides and rear, and three-tenths of a mile vertically would typically give one minute for evasive maneuvering action which is normally entirely adequate. Receiver sensitivity is also a factor in determining the effective region, and the sensitivity of the receiver should be coordinated with the power of the transmitter to make the system effective in the region indicated.

Electrically connected, as shown to the pulser 3 is a divider 11 which, for example, is a conventional scaler, for example, which will deliver at its output side a selected fraction of the pulse repetition frequency of the pulser 3. Specifically, if the pulse repetition frequency of the pulser 3 is the 100 cycles per second of its normal free running condition the output of the divider can be made one-tenth of this, or 10 cycles per second, which will not operate a speaker or a pair of earphones 12 connected to the output of the divider inasmuch as 10 cycles per second is below the audible range. It is the purpose of the divider 11 to fractionally reduce in the same manner the pulse repetition frequency of the pulser 3 to thereby indicate in the speaker or earphones 12 an audible signal when there is a sharp increase in the pulse repetition frequency of the pulser 3 due to the presence of an adjacent aircraft, all as hereinafter more particularly described.

Another means for indicating a sharp increase in the pulser repetition frequency is to electrically connect, as diagrammatically shown, a filter 13 between the output of the receiver 1 and the input of the pulser 3, with the output of the filter being connected to a relay 14 which in turn will operate a light or buzzer 15 by way of warning. The filter 13 is conventional per se, and in its simplest form constitutes a condenser which is charged up a small amount by each pulse passed from the output of the receiver 1, and if the number of pulses received in a given time exceeds a selected amount the relay 14 is operated to close an electric circuit to the warning light or buzzer 15.

A push-to-talk mechanism is associated with the apparatus described so that if a warning is given by either the warning device 15 or by the speaker or earphones 12, the pilot of the aircraft can immediately talk to the pilot of the dangerously adjacent aircraft. This is accomplished in the manner illustrated in FIGURE 1 by the provision of a microphone 16 having a push-to-talk button 17 the microphone being connected to conventional speech circuits 18 connected to transmitter 4. The speech circuits 18 include conventional amplifying means and modulating means, as will be understood. Thus, when button 17 is pushed transmitter 4 generates a continuous wave at the aforesaid 132 megacycle per second frequency and this wave is modulated to establish direct speech contact between the pilots of adjacent aircraft so that each can give his heading and altitude and with any necessary evasive action then being taken. The output of the receiver 1 is connected to the speaker or earphones 12 for this purpose, for example by a connection 12a and a switch 12b. The speech circuits 18 constitute a conventional modulator and amplifier, and need not be shown in greater detail.

The operation of the apparatus will now be described. First it will be understood that an apparatus of the type shown in FIGURE 1 will be present in each aircraft utilizing the warning system. In the initial or normal operation of the apparatus without another aircraft in the wave pattern of FIGURES 2 and 3, so that there is no danger of collision, the transmitter 4 will transmit the aforesaid 100 pulses per second, each of 10 microseconds time, and at a frequency of 132 megacycles per second, and with a band width of 100 kilocycles per second. At this time the output of the divider 11 will be only 10 cycles per second, and no audible pitch will be heard in the earphones 12. The receiver 1 is blocked during the transmission time of each pulse, there is no other aircraft in collision vicinity and no pulse is picked up by the receiver 1 so that there is no output pulse from the receiver 1 to either the filter 13, to the earphones 12, or to the pulser 3.

Now assume that another aircraft called B, carrying the apparatus of FIGURE 1, enters the wave pattern of FIGS. 2 and 3 of aircraft A and with aircraft B generating a wave pattern in which is aircraft A. The pulse transmitted by aircraft A is picked up by the receiver of aircraft B which immediately triggers the pulser 3 of aircraft B to send out a pulse, this transmitted pulse is picked up by the receiver of aircraft A to immediately trigger the pulser 3 of aircraft A to send out a pulse, with this action being continued to produce a "ring around pulsing." Thus the pulsing of the systems has changed from a free running mode to a mutually slaved mode, and the pulse repetition frequency immediately jumps from the 100 cycles per second to a much higher pulse repetition frequency. The frequency of the slaved pulsing is inversely related to the distance between the aircraft, being determined by the time of propagation of radio signals and the delays in the transponders. For a 10 microsecond delay in passing through the transponders, the pulse repetition frequency is 38 kilocycles per second at one-half mile distance and 3.8 kilocycles per second at a twenty mile distance.

Now the means for indicating the sharp increase in the pulse repetition frequency come into play. Looking first at the divider 11, and with the aircraft at twenty miles distance the 3.8 kilocycle pulse repetition frequency at the output of the pulser 3 becomes 380 cycles per second in the earphones 12, well within the audible range. But as the aircraft continue to move towards each other, the distance between the aircraft shortens, and the pulse repetition frequency increases to 38 kilocycles at one-half mile distance, this being 3800 cycles at the output of the divider 11 and in the earphones 12 so that as the aircraft move towards each other from twenty miles apart there is a steadily increasing pitch of audible sound in the earphones 12, indicating that the planes are shortening in range, and that definite hazard is present.

It should be noted here that the pitch of the audible signal is a definite indication of range.

The operation of the filter 13, relay 14, and warning means 15 for indicating a sharp increase in pulse repetition frequency has already been described. However, the mechanisms 13, 14 and 15 are normally used as an alternate to the divider 11 and only one type of means for indicating the sharp increase in pulse repetition frequency is used in a single transponder.

Once the pilot of one or both of the aircraft has been given the warning of an approaching aircraft either by means 15 or speaker or earphones 12 he presses the push-to-talk button 17 of microphone 16, closes switch 12b, and establishes direct speech contact with the pilot of the dangerously adjacent aircraft. Each pilot gives his heading and altitude, and any necessary action can be taken to avoid collision. If the range between the aircraft is not closing the pitch in the earphones 12 remains constant, but as the aircraft move apart the pitch in the earphones 12 gradually decreases in an action the reverse of the increasing pitch, and both pilots know that any danger of collision has passed.

As soon as the aircraft pass out of range of each other, i.e., out of substantially the wave patterns of FIGURES 2 and 3 of each other, the apparatus of FIGURE 1 automatically returns to the free running normal 100 cycles per second pulse repetition frequency, and the apparatus is ready to perform its function again.

While certain representative embodiments and details have been shown for the purpose of illustrating the invention, it will be apparent to those skilled in this art that various changes and modifications may be made therein without departing from the spirit or scope of the invention.

What is claimed is:

1. A vehicle collision warning system including a transponder in each vehicle tuned to the same wave length and having a relatively short range, antennas for said transponders and generating a wave pattern over two times as long in the direction of movement of the vehicle as at right angles thereto, a pulser for each transponder and firing the transmitter of each transponder, each pulser being normally free running and generating a short pulse at a relatively low pulse repetition frequency but being adapted to be triggered by a pulse picked up by the receiver of its transponder, means blocking the receiver of each transponder during the transmission of a pulse by the transmitter of the transponder, a divider in each transponder and connected to the pulser and delivering a selected fraction of the pulses passed to the transmitter, means in each transponder for converting the output of the divider to audible sound when two vehicles are within transponder range of each other, the pulse repetition rate of the free running pulser and the selected fraction of the pulses passed by the divider being such that no audible sound is produced by the converting means when two vehicles are outside of transponder range of each other, and means connected to the receiver of each transponder for indicating when the pulse repetition rate increases beyond a selected limit to thereby show the dangerously near presence of another vehicle.

2. A vehicle collision warning system including a transponder in each vehicle tuned to the same wave length and having a relatively short range, a pulser for each transponder and firing the transmitter of each transponder, each pulser being normally free running and generating a short pulse at a relatively low pulse repetition frequency but being adapted to be triggered by a pulse picked up by the receiver of its transponder, means blocking the receiver of each transponder during the transmission of a pulse by the transmitter of the transponder, a divider in each transponder and connected to the pulser and delivering a selected fraction of the pulses passed to the transmitter, means in each transponder for converting the output of the divider to audible sound when two vehicles are within transponder range of each other, the pulse repetition rate of the free running pulser and the selected fraction of the pulses passed by the divider being such that no audible sound is produced by the converting means when two vehicles are outside of transponder range of each other, speech circuits for modulating transponder, manually-controlled means for connecting the speech circuits to each transponder whereby to establish direct speech contact between pilots of adjacent aircraft and means connected to the receiver of each transponder for indicating when the pulse repetition rate increases beyond a selected limit to thereby show the dangerously near presence of another vehicle.

3. A vehicle collision warning system including a transponder in each vehicle tuned to the same wave length and having a relatively short range, antennas for said transponders and generating a wave pattern over two times as long in the direction of movement of the vehicle as at right angles thereto, a pulser for each transponder and firing the transmitter of each transponder, each pulser being normally free running and generating a short pulse at a relatively low pulse repetition frequency but being adapted to be triggered by a pulse picked up by the receiver of its transponder, means blocking the receiver of each transponder during the transmission of a pulse by the transmitter of the transponder, a divider in each transponder and connected to the pulser and delivering a selected fraction of the pulses passed to the transmitter, means in each transponder for converting the output of the divider to audible sound when two vehicles are within transponder range of each other, the pulse repetition rate of the free running pulser and the selected fraction of the pulses passed by the divider being such that no audible sound is produced by the converging means when two vehicles are outside of transponder range of each other, and speech circuits for modulating each transponder, to thereby show the dangerously near presence of another vehicle.

4. A vehicle collision warning system including a transponder in each vehicle tuned to the same wave length and having a relatively short range, antennas for said transponders and generating a wave pattern over two times as long in the direction of movement of the vehicle as at right angles thereto, a pulser for each transponder and firing the transmitter of each transponder, each pulser being normally free running and generating a short pulse at a relatively low pulse repetition frequency but being adapted to be triggered by a pulse picked up by the receiver of its transponder, means blocking the receiver of each transponder during the transmission of a pulse by the transmitter of the transponder, speech circuits for modulating each transponder, manually-controlled means for connecting the speech circuits to each transponder whereby to establish direct speech contact between pilots of adjacent aircraft and means connected to the receiver of each transponder for indicating when the pulse repetition rate increases beyond a selected limit to thereby show the dangerously near presence of another vehicle.

5. Apparatus for warning against aircraft collision and including a transponder in each aircraft tuned to the same wave length and having a relatively short range, each transponder having free running but triggerable means for generating a short pulse at a relatively low pulse repetition frequency, a radio transmitter operated by each pulse and producing a radio frequency pulse, an antenna for propagating the radio frequency pulse isotropically over relatively short range but in a direction at least several times greater forwardly of the aircraft than laterally or vertically, a receiver tuned to the frequency of the transmitter and adapted to trigger the transmitter to generate a radio frequency pulse upon the reception of a radio frequency pulse, means indicating a sharp increase in the pulse repetition frequency of the transmitter, and push-to-talk microphone and speech circuits for modulating the transmitter.

6. Apparatus as defined in claim 5 wherein the means indicating a sharp increase in the pulse repetition frequency include a divider for fractionally reducing the pulse repetition frequency at the output of the divider, and speaker means for audibly reproducing the output of the divider, said audible means producing an increase in pitch with an increase in pulse repetition frequency, and a decrease in pitch with a decrease in pulse repetition frequency.

7. Apparatus as defined in claim 5 wherein the means indicating a sharp increase in the pulse repetition frequency include a filter for adding the pulses, a relay fired by the filter when the frequency exceeds a selected amount in a given time, and a warning signal operated by the relay.

8. Apparatus for warning against aircraft collision and including a transponder in each aircraft tuned to the same wave length and having a relatively short range, each transponder having free running but triggerable means for generating a short pulse at a relatively low pulse repetition frequency, a transmitter fired by each pulse to produce a corresponding radio frequency pulse, an antenna for propagating the radio frequency pulse over relatively short range but in a direction at least several times greater forwardly of the aircraft than laterally or vertically, a receiver tuned to the frequency of the transmitter and adapted to trigger the transmitter to generate a pulse upon the reception of a pulse, and means indicating a sharp increase in the pulse repetition frequency of the pulse generating means.

9. Apparatus for warning against aircraft collision and including a transponder in each aircraft tuned to the same wave length and having a relatively short range, each transponder having free running but triggerable means for generating a short pulse at a relatively low pulse repetition frequency, a transmitter fired by each pulse to produce a corresponding radio frequency pulse, an antenna for propagating the radio frequency pulse, a receiver tuned to the frequency of the transmitter and adapted to trigger the transmitter to generate a pulse upon the reception of a pulse, and means indicating a sharp increase in the pulse repetition frequency of the pulse generating means.

10. Apparatus for warning against aircraft collision and including a transponder in each aircraft tuned to the same wave length and having a relatively short range, each transponder having free running but triggerable means for generating a short pulse at a relatively low pulse repetition frequency, a transmitter fired by each pulse to produce a corresponding radio frequency pulse, an antenna for propagating the radio frequency pulse, a receiver tuned to the frequency of the transmitter and adapted to trigger the transmitter to generate a pulse upon the reception of a pulse and audio frequency means for indicating a sharp increase in the pulse repetition frequency of the pulse generating means and the presence of another aircraft, the pitch of the audio frequency means indicating distance and the change in pitch collision hazard with respect to the other aircraft.

References Cited in the file of this patent

UNITED STATES PATENTS

| | | |
|---|---|---|
| 2,454,773 | Chatterjea | Nov. 30, 1948 |

FOREIGN PATENTS

| | | |
|---|---|---|
| 288,233 | Great Britain | Sept. 6, 1928 |
| 133,807 | Australia | Aug. 8, 1949 |